US010763679B2

(12) United States Patent
Kutkut et al.

(10) Patent No.: US 10,763,679 B2
(45) Date of Patent: Sep. 1, 2020

(54) BATTERY MANAGEMENT SYSTEM INCLUDING CLOUD SERVER TO SCHEDULE BATTERIES FOR USE AND RELATED METHODS

(71) Applicant: Advanced Charging Technologies Inc., La Miranda, CA (US)

(72) Inventors: Nasser Kutkut, Orlando, FL (US); Thikrallah Shreah, Oviedo, FL (US)

(73) Assignee: Advanced Charging Technologies Inc., Fountain Valley, CA (US)

( * ) Notice: Subject to any disclaimer, the term of this patent is extended or adjusted under 35 U.S.C. 154(b) by 334 days.

(21) Appl. No.: 15/952,900

(22) Filed: Apr. 13, 2018

(65) Prior Publication Data

US 2018/0331546 A1    Nov. 15, 2018

Related U.S. Application Data

(60) Provisional application No. 62/248,458, filed on Apr. 14, 2017.

(51) Int. Cl.
*H02J 7/00* (2006.01)
*H02J 7/02* (2016.01)
(Continued)

(52) U.S. Cl.
CPC .......... *H02J 7/0026* (2013.01); *B60L 3/0046* (2013.01); *B60L 58/12* (2019.02); *B60L 58/14* (2019.02);
(Continued)

(58) Field of Classification Search
CPC .......... B60L 53/12; B60L 58/12; B60L 58/14; B60L 11/182; B60L 11/1861;
(Continued)

(56) References Cited

U.S. PATENT DOCUMENTS 7,772,850 B2 *    8/2010   Bertness   ............   G01R 31/3648
                                                       324/426
10,424,131 B2 *   9/2019   Kutkut     ...................   G07C 5/008
(Continued)

OTHER PUBLICATIONS

Kutkut; U.S. Appl. No. 12/942,733, Filed Apr. 8, 2015.
(Continued)

*Primary Examiner* — M'Baye Diao
(74) *Attorney, Agent, or Firm* — Allen, Dyer, Doppelt + Gilchrist, P.A.

(57) ABSTRACT

A battery management system for batteries at a geographical location may include wireless battery chargers at the geographical location for charging the batteries and wireless battery monitors at the geographical location and carried by associated ones of the batteries. The battery management system may also include a battery management cloud server for communicating with the wireless battery chargers and the wireless battery monitors to remotely collect battery charging status data from the wireless battery chargers based upon charging of the batteries and to remotely collect battery status data for the batteries from the wireless battery monitors. The battery management cloud server may also remotely process the battery and charger status data to schedule the batteries for use based upon the battery and charger status data.

23 Claims, 4 Drawing Sheets

(51) Int. Cl.
*B60L 58/12* (2019.01)
*H02J 13/00* (2006.01)
*H04L 29/08* (2006.01)
*B60L 58/14* (2019.01)
*B60L 58/15* (2019.01)
*B60L 3/00* (2019.01)
*H04W 4/38* (2018.01)
*H01M 10/42* (2006.01)

(52) U.S. Cl.
CPC ............ *B60L 58/15* (2019.02); *H02J 7/0022* (2013.01); *H02J 7/025* (2013.01); *H02J 13/0003* (2013.01); *H04L 67/325* (2013.01); *B60L 2200/40* (2013.01); *B60L 2240/545* (2013.01); *B60L 2240/547* (2013.01); *B60L 2240/549* (2013.01); *H01M 10/4257* (2013.01); *H02J 7/00036* (2020.01); *H02J 7/0048* (2020.01); *H04L 67/10* (2013.01); *H04W 4/38* (2018.02)

(58) Field of Classification Search
CPC .. B60L 58/15; B60L 3/0046; B60L 2240/549; B60L 2240/547; B60L 2200/40; B60L 2240/545; H01M 10/4257; H02J 7/00036; H02J 7/0048; H02J 2310/48; H02J 7/0026; H02J 7/025; H04W 4/38; H04L 67/10; H04L 67/325

USPC ......................................................... 320/106
See application file for complete search history.

(56) References Cited

U.S. PATENT DOCUMENTS

| | | | | |
|---|---|---|---|---|
| 2010/0121588 | A1* | 5/2010 | Elder | B60L 58/16 702/63 |
| 2011/0264316 | A1* | 10/2011 | McCabe | B60L 50/60 701/22 |
| 2014/0266779 | A1* | 9/2014 | Grothaus | H04L 67/12 340/870.02 |
| 2016/0046199 | A1* | 2/2016 | Butler | G06Q 50/00 320/106 |
| 2016/0126755 | A1* | 5/2016 | Kechmire | H02J 7/00 320/106 |

OTHER PUBLICATIONS

Kutkut; U.S. Appl. No. 15/067,283, Filed Mar. 11, 2016.
Kutkut; U.S. Appl. No. 15/922,127, Filed Mar. 15, 2018.
Kutkut et al.;U.S. Appl. No. 15/939,862, Filed Mar. 29, 2018.
Kutkut; U.S. Appl. No. 15/944,010, Filed Apr. 3, 2018.
Kutkut; U.S. Appl. No. 15/952,358, Filed Apr. 13, 2018.

* cited by examiner

BATTERY MANAGEMENT SYSTEM INCLUDING CLOUD SERVER TO SCHEDULE BATTERIES FOR USE AND RELATED METHODS

RELATED APPLICATIONS

The present application claims the priority benefit of provisional application Ser. No. 62/485,458 filed on Apr. 14, 2017, the entire contents of which are herein incorporated in its entirety by reference.

TECHNICAL FIELD

The present invention relates generally to battery systems, and more specifically to a cloud-based battery management system and related methods.

BACKGROUND

Batteries are utilized in many traction and motive power applications to power electrical equipment and vehicles. Typical motive power applications include electric forklift trucks, reach trucks, pallet jacks, and automated guided vehicles.

In order to ensure proper operation of these vehicles, the batteries need to be charged regularly and may need to be monitored. Battery charging is the process of replenishing the discharged electrical energy from the electrical power network. This task is accomplished by employing battery chargers that are equipped with microprocessor controls to optimize the battery charging process.

Most battery chargers incorporate a power conversion stage for converting the incoming alternating current (AC) power from the electrical grid into a direct current (DC) power suitable for the battery. In addition, current chargers typically incorporate sense circuitry along with microprocessor controls to control the output current and voltage of the charger throughout the charge process, as well as save charge cycle records. Advanced chargers may also incorporate wired or wireless interfaces, such as RS-232, USB, ZigBee, Bluetooth, or WiFi, which allows end users to set up the charger parameters. The onboard microprocessor typically runs a firmware program that controls the charger operation, stores data, and communicates with a computer or handheld device to receive new charger set points.

Battery monitoring may also be desirable to monitor the status of batteries to ensure proper battery health and performance. A typical battery monitoring unit typically incorporates a microprocessor, memory for data storage, sensing circuitry, and some wired or wireless interface to set up the unit and download stored parameters. The battery monitor measures and stores battery voltage, battery current, battery temperature, and battery amp-hours throughout the charge and discharge (use) cycles. In addition, various settings are typically stored in these battery monitoring units including battery size, nameplate rating, battery ID and serial number, among other things. The battery monitor onboard microprocessor typically runs a firmware program that controls the charger operation, stores data, and communicates with a computer or handheld device to receive new charger set points and download stored data.

In most applications, the battery is sized to power an industrial truck for a single shift. As such, in multi-shift applications, battery changing may be desirable. This typically requires more than one battery per truck to power the truck throughout the day. When a depleted battery is removed from the truck, it is typically placed on a rack to be charged. Typical battery racks may have anywhere from a few batteries to hundreds of batteries stacked on shelves with chargers connected to each battery. Battery charging can take approximately eight (8) hours followed by a cool down period of a few hours. As battery racks may have multiple batteries connected to the chargers, the task of selecting the ready battery, namely a charged or a rested battery, can be daunting.

Battery light indicators have been used to alert users to batteries that are ready to be used for the next truck. However, in applications with large numbers of trucks and batteries, identifying the state of lights installed on each battery can be very difficult.

Battery management systems have been used to simplify the process of selecting the next battery that is ready to be used. These battery management systems typically include sensing devices (battery sensors) that are installed at the charger side (connected to the charger cable) that detect whether a battery is connected or not. These sensors are typically equipped with daisy chained communication ports (links) that ultimately connect to a central controller. Each sensor is assigned to a specific charger and specific battery bay with racks, where a given battery is placed. The combination of the central controller along with the battery sensors track connectivity of batteries, charge process, and duration of charge termination to identify the order of batteries to be selected. These systems may include visual and audio alerts notifying users which battery to select and/or alerting users when selecting the wrong battery.

One of the main drawbacks of most battery management systems is the cost involved in installing the added hardware and software to manage these batteries. Typical systems can costs thousands to tens of thousands of dollars, making their deployment limited to customers with very large fleets. In addition, many of the analytics and decisions made by these systems is limited as batteries cannot be uniquely identified. For example, if multiple batteries are ready to be selected, the system simply selects the first battery that reported being ready (first-in-first-out or FIFO system).

Another limitation of most battery management systems is that they are add-on devices that are separate from the chargers and do not report any charger status. For example, if the charge cycle did not terminate correctly due to battery fault or charger fault, the battery management system may still list the battery as being ready for use. In fact, since most batteries in use are flooded lead acid batteries, many of these batteries may require watering after a charge cycle to ensure proper operation. Yet, most battery management systems cannot even identify the batteries, and hence cannot assess any battery status issues.

Due to the drawbacks of many existing battery management systems, further improvements may be desirable for a cloud based battery management system.

SUMMARY

A battery management system for a plurality of batteries at a geographical location may include a plurality of wireless battery chargers at the geographical location for charging the plurality of batteries and a plurality of wireless battery monitors at the geographical location and carried by associated ones of the plurality of batteries. The battery management system may further include a battery management cloud server for communicating with the wireless battery chargers and the wireless battery monitors to remotely collect battery charging status data from the plurality of wireless battery chargers based upon charging of the batteries. The battery management cloud server may also remotely collect battery status data for the batteries from the wireless battery monitors and remotely process the battery and charger status data to schedule the batteries for use based upon the battery and charger status data.

The battery management cloud server may be configured to remotely process the battery and charger status data to determine when charging faults and battery faults occur with respective batteries and schedule the batteries for use when no charging faults or battery faults are associated therewith. The battery management cloud server may be configured to rank the batteries based upon an order that the batteries have been successfully charged.

The battery management cloud server may be configured to rank the scheduled batteries for use based upon the battery and charger status data, for example. The battery status data may include at least one of battery utilization and battery usage, for example.

The battery management cloud server may be configured to communicate to a remote device a next battery for use from the ranked batteries. Each battery may be associated with a battery-operated vehicle, and the battery management cloud server may be configured to rank the batteries based upon a type of the battery-operated vehicle, for example.

The wireless battery monitors may be configured to communicate the battery status data for the batteries based upon connection of the batteries to the wireless battery chargers, for example.

The battery charging status data may include at least one of charger-connected-to-battery and charging, charger-connected-to-battery and cooling, charger-connected-to-battery and reporting a fault, charge cycle completed, charge cycle terminated, and charger-disconnected-from-battery. The battery status data may include at least one of battery type, battery temperature, battery water level, historical battery usage, battery amp-hour usage, battery life, and battery size, for example.

The battery management cloud server may further be configured to generate and send alerts to a remote device based upon the battery status data. The alerts may include error indications corresponding to charging faults and the battery faults.

A method aspect is directed to a battery management method for a battery management system for a plurality of batteries at a geographical location. The method may include using a battery management cloud server for communicating with a plurality of wireless battery chargers at the geographical location for charging the plurality of batteries and a plurality of wireless battery monitors at the geographical location and carried by associated ones of the plurality of batteries. The battery management cloud server may be used to remotely collect battery charging status data from the plurality of wireless battery chargers based upon charging of the batteries and remotely collect battery status data for the batteries from the wireless battery monitors. The battery management cloud server may also be configured to remotely process the battery and charger status data to schedule the batteries for use based upon the battery and charger status data.

A computer readable medium aspect is directed to a non-transitory computer readable medium for a battery management cloud server of a battery management system for a plurality of batteries at a geographical location. The battery management cloud server is for communicating with a plurality of wireless battery chargers at the geographical location for charging the plurality of batteries and a plurality of wireless battery monitors at the geographical location and carried by associated ones of the plurality of batteries. The non-transitory computer readable medium has computer executable instructions that when executed by a processor of the battery management cloud server cause the processor to perform operations. The operations may include remotely collecting battery charging status data from the plurality of wireless battery chargers based upon charging of the batteries and remotely collecting battery status data for the batteries from the wireless battery monitors. The operations may also include remotely processing the battery and charger status data to schedule the batteries for use based upon the battery and charger status data.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
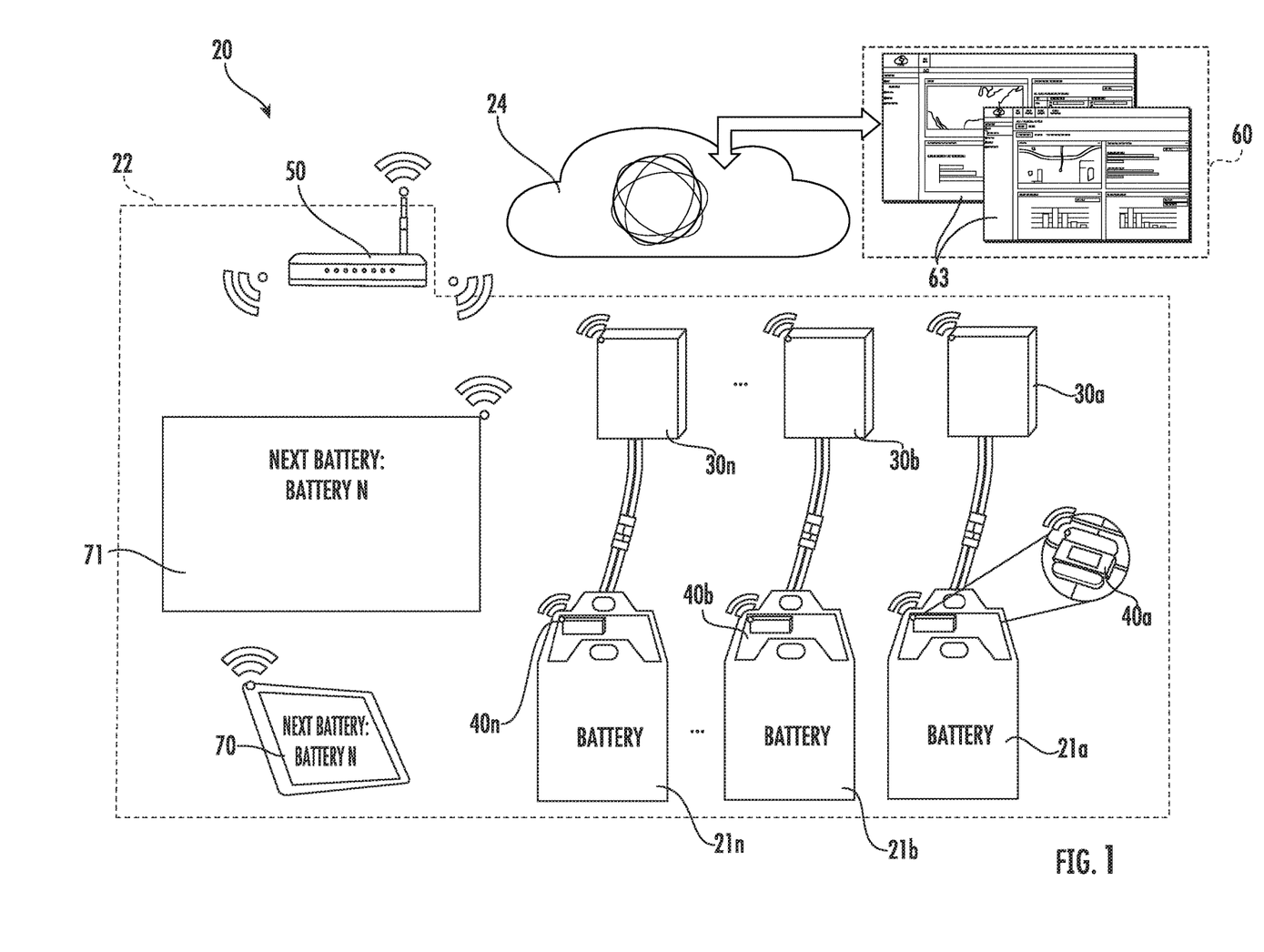
FIG. 1 is a schematic diagram of a battery management system according to an embodiment.
Figure 2:
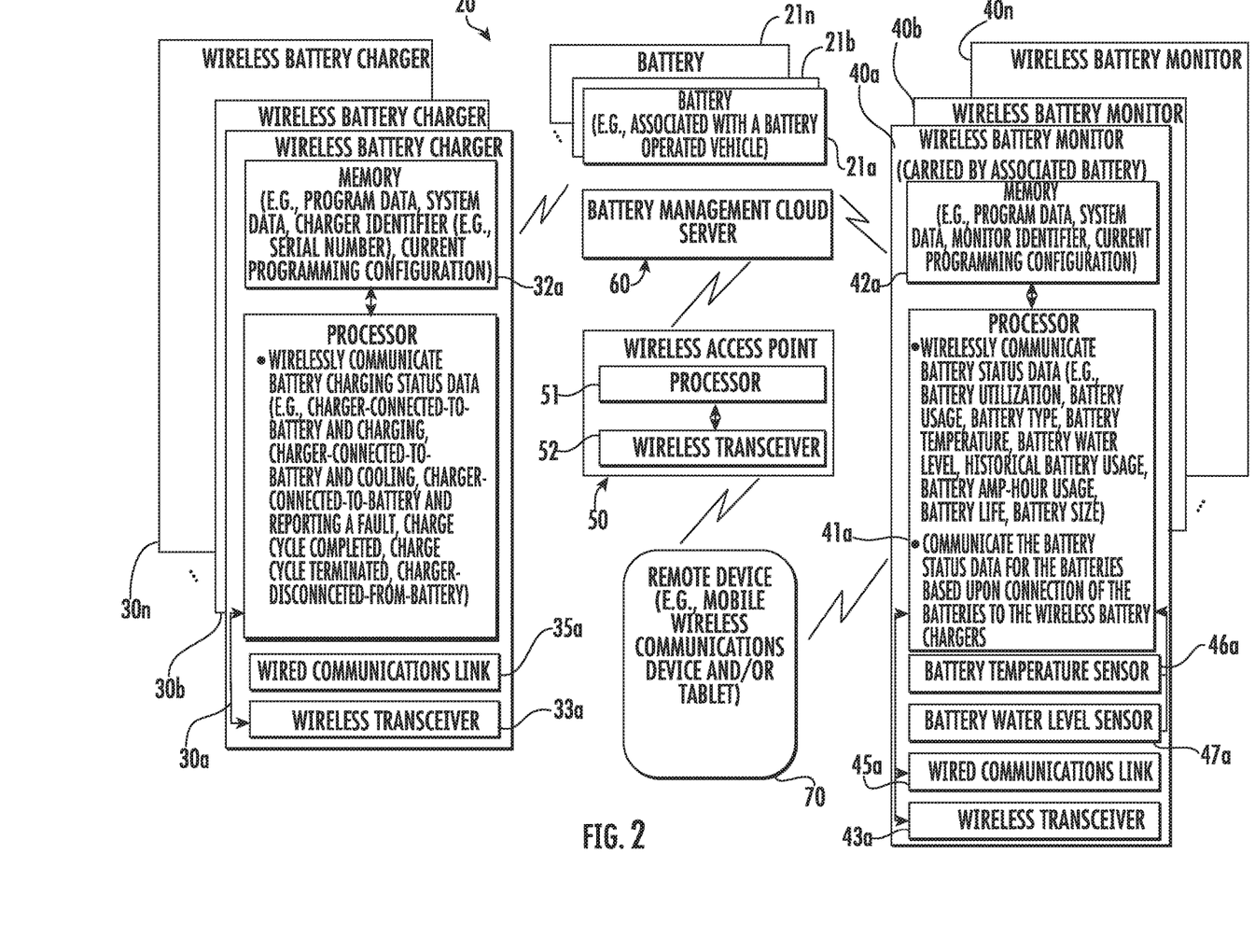
FIG. 2 is another schematic diagram of the battery management system of FIG. 1.
Figure 3:
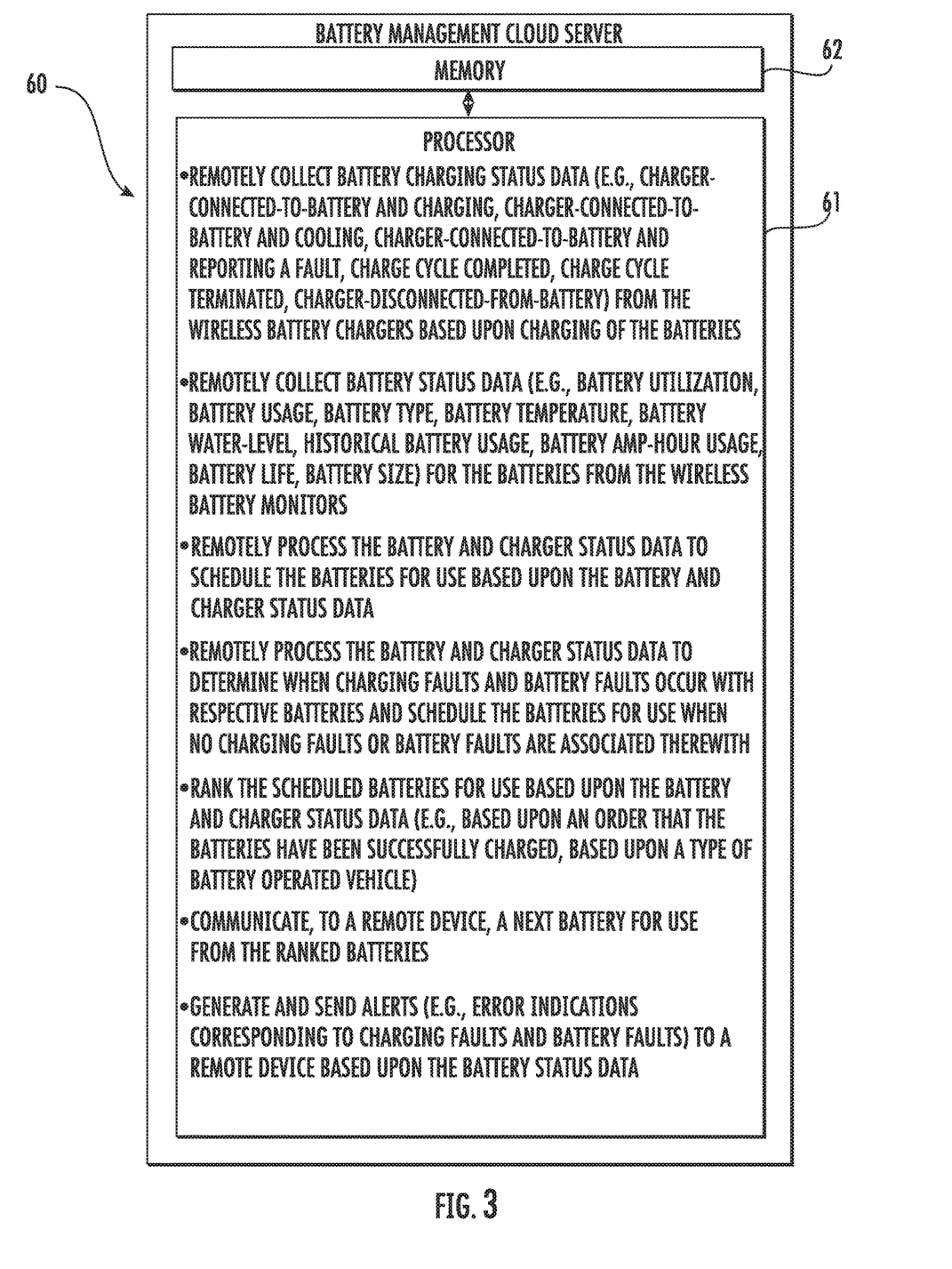
FIG. 3 is a schematic diagram of the battery management cloud server of FIG. 2.

Referring now to FIGS. 1-3, a battery management system 20 is for a plurality of batteries 21a-21n at a geographical location 22. The battery management system 20 includes wireless battery chargers 30a-30n at the geographical location 22. The wireless battery chargers 30a-30n are for charging the batteries 21a-21n.

Each wireless battery charger 30a-30n may include a charger processor 31a (e.g., a microprocessor) and a memory 32a coupled to the processor for storing program and system data. Each wireless battery charger 30a-30n also includes a wireless transceiver 33a. The wireless transceiver 33a may cooperate with the charger processor 31a to wirelessly communicate using one or more communications protocols, for example, WiFi, short-range (e.g., NFC, Bluetooth), cellular, etc. The battery chargers 30a-30n may also include a wired communication link 35a coupled to the processor 31a, such as, for example, an RS-485 or power line communications link. The wired communication link 35a may permit a wireless battery charger 30a-30n to communicate (e.g., directly) with wireless battery monitors 40a-40n during a charge cycle and to exchange battery and charger parameters and settings, for example.

The battery management system 20 also may include wireless battery monitors 40a-40n at the geographical location 22. More particularly, the wireless battery monitors 40a-40n are carried by (e.g., physically coupled, directly affixed) corresponding batteries 21a-21n.

The wireless battery monitors 40a-40n are for monitoring the batteries 21a-21n, for example, charging, discharging, etc., and each of the wireless battery monitors is remotely configurable and has a current monitor programming configuration and a monitor identifier associated therewith.

Each wireless battery monitor 40a-40n may include a monitor processor 41a (e.g., a microprocessor) and a memory 42a coupled to the processor for storing program and system data. Each wireless battery monitor 40a-40n also includes a wireless transceiver 43a. The wireless transceiver 43a may cooperate with the monitor processor 41a to wirelessly communicate using one or more communications protocols, for example, WiFi, short-range (e.g., NFC, Bluetooth), cellular, etc. Each wireless battery monitor 40a-40n may communicate, via the corresponding wireless transceiver 43a-43n, directly with the wireless battery chargers 30a-30n during a charge cycle and exchange battery and charger parameters and settings, for example. The battery monitors 40a-40n may also each include a wired communication link 45a coupled to the processor 41a, such as, for example, an RS-485 or power line communications link. The wired communication link 45a may permit a wireless battery monitor 40a-40n to communicate (e.g., directly) with battery chargers 30a-30n during a charge cycle and to exchange battery and charger parameters and settings, for example.

Each wireless battery monitor 40a-40n may also include a battery temperature sensor 46a coupled to the processor 41a and an electrolyte or water level sensor 47a (e.g., for flooded batteries) also coupled to the processor. The battery temperature sensor 46a and water level sensor 47a, which may be integrated within the battery 21a, cooperate with the processor 41a to measure and report battery temperature and electrolyte or water level of the battery, respectively.

The battery management system 20 may also include a wireless access point 50 at the geographical location 22 for communicating with the wireless battery chargers 30a-30n, the wireless battery monitors 40a-40n, and a battery management cloud server 60 in the cloud. The wireless access point 50 may be in the form of a wireless router and/or wireless gateway, for example.

The battery management cloud server 60 communicates with the wireless battery chargers 30a-30n and the wireless battery monitors 40a-40n by way of a network 24, for example, the internet and through the wireless access point 50. The battery management cloud server 60 includes a processor 61 and a memory 62 cooperating therewith. The battery management cloud server 60 may execute a battery monitor cloud application 63 (Cloud App) based upon a cloud computing platform, such as Amazon Web Services (AWS). The battery monitor cloud application 63 may cause the wireless access point 50 to facilitate or perform the functions or operations described herein. A software application may execute on a remote device or a mobile wireless communications device 70, such as, for example, a smartphone, tablet, mobile device, or stationary device and communicate with the battery management cloud server 60. The battery management cloud server 60 or cloud computing platform may include a collection of data and resources (e.g., hardware, data and/or software) provided and maintained by an off-site or off-premise party (e.g., third party), wherein the collection of data and resources can be accessed by an identified user via a network.

The mobile wireless communications device 70 and/or other wireless devices, for example, may include a local display 71 at the geographical location 22, may wirelessly communicate with the battery management cloud server 60 via the battery monitor cloud application 63. A battery 21a-21n to be selected, for example, and alerts, for example if the wrong battery is selected, may be communicated by way of the mobile wireless communications device 70 and/or local display 71 to an end user, as will be described in further detail below.

Referring again to the wireless access point 50, the wireless access point may include a processor 51 and an access point wireless transceiver 52 cooperating with the processor to communicate with the local (i.e., at the geographical location 22) wireless battery chargers 30a-30n and wireless battery monitors 40a-40n. A backhaul transceiver may also be provided to communicate with the battery monitor cloud application 63. By way of example, the local wireless network (i.e., at the geographical location 22) may be Wi-Fi, ZigBee, or sub GHz ISM band. Also by way of example, the backhaul may be via Ethernet, Wi-Fi, cell, or other wired or wireless connection to the internet. The wireless access point 50, by way of the processor 51, may further establish a local area network (LAN) at the geographical location 22 with a dedicated network ID and passcode, where the network ID and passcode are stored in the wireless battery chargers 30a-30n and wireless battery monitors 40a-40n at the geographical location, thus allowing only those wireless battery chargers and wireless monitors to connect to the local area network.

Configuration of the wireless battery chargers 30a-30n may be performed wirelessly using the software application or by way of the battery management cloud server 60. More particularly, the configuration may be performed, in some embodiments, using the cloud application 63. For example, upon installation of a given wireless battery charger 30a-30n, the corresponding charger ID, serial number, the various battery charging parameters, the preferred charge algorithm, and the various charger options may be entered and saved into the charger memory 32a using the mobile wireless communications device 70 or tablet wirelessly coupled to the network 24 and the cloud application 63. By way of the software application or the cloud application 63, the wireless battery charger programmed values may be synchronized to the cloud or the battery management cloud server 60, and may be tagged with the charger serial number and identification (ID). Additional parameters, such as, for example, the geographical location 22 where the wireless battery charger 30a-30n is installed, installation date, customer and dealer contact info, along with other data can be saved to the cloud or battery management cloud server 60 rather than locally into the wireless battery charger and tagged with the charger serial number and ID.

Configuration of the wireless battery monitors 40a-40n may be performed wirelessly using the software application or cloud application 63. For example, upon installation of a given wireless battery monitor 40a-40n, the battery monitor ID, the battery monitor serial number, the battery ID, the battery serial number, the model number, and various battery parameters, such as nominal voltage, amp-hours, manufacturing date, etc. may also be entered and saved into the monitor memory 42a using the mobile wireless communications device 70, for example, wirelessly connected to the network 24 or LAN and the cloud application 63. By way of the cloud application 63, the wireless monitor programmed values may be synchronized to the cloud or the battery management cloud server 60, and may be tagged with the monitor serial number and ID. Additional parameters, such as, for example, the geographical location 22 where the wireless battery monitor 40a-40n is installed, installation date, the type of vehicle associated with the battery (e.g., sitdown, reach, pallet, etc.), along with other data can be saved to the cloud or battery management cloud server 60 rather than locally into the wireless battery monitor and tagged with the charger serial number and ID.

The battery management cloud server 60, for example, by way of the cloud application 63, may initiate remote communication with some or all of the wireless battery chargers 30a-30n and wireless battery monitors 40a-40n within a geographical location 22. Upon receiving a request from the battery management cloud server 60 or cloud application 63, the respective wireless battery chargers 30a-30n and wireless battery monitors 40a-40n respond to the request. The request may include reporting battery status data and/or charger status data. Battery status data may include battery utilization data, battery usage, battery type, battery temperature, battery water level, historical battery usage, historical and aggregate amp-hour usage, battery life, and/or battery size, for example. Of course battery status data may include other and/or additional types of data. Battery charging status data may include charger connected to battery and charging, charger connected to battery and cooling down, charger connected to a battery and reporting charger or battery fault, charge cycle completed or terminated, battery disconnected from charger. The battery charging status data may include other and/or additional types of data. In other words, the battery management cloud server 60 remotely collects battery charging status data from the wireless battery chargers 30a-30n based upon charging of the batteries 21a-21n and remotely collects battery status data for the batteries from the wireless battery monitors 40a-40n.

The cloud application 63 may tag the configuration and data records for the wireless battery monitors 40a-40n and wireless battery chargers 30a-30n with their respective device ID and or device serial number. Upon placing a battery 21a-21n on a rack or in a battery charger bay and connecting it to the wireless battery charger 30a-30n, the wireless battery monitor 40a-40n, which is carried by the corresponding battery, communicates with the wireless battery charger and relays its battery ID and serial number information to the wireless battery charger as well as to the battery management cloud server 60 or cloud application 63. The wireless battery charger 30a-30n tags the respective charge record with the battery ID and relays its status through the cloud application 63 to the battery management cloud server 60. In other words, the wireless battery monitors 40a-40n may communicate the battery status data for the batteries 21a-21n based upon connection of the batteries to the wireless battery chargers 30a-30n.

The battery management cloud server 60 by way of the cloud application 63 may further analyze all battery and charger status data and rank batteries 21a-21n to be selected based on several criteria including the order of batteries that have been successfully charged (charge cycle terminated with no faults) and cooled down, the battery aggregate amp-hour usage (which is an indication of battery utilization through the battery life time), battery size and associated truck, and so on. The next battery 21a-21n to be selected for each vehicle type is then displayed on the end users' mobile device 70 or tablet or any installed monitoring device, for example, a local display 71, at the geographical location 22. In other words, the battery management cloud server 60 may rank the scheduled batteries for use based upon the battery and charger status data, for example, based upon the order the batteries 21a-21n have been successfully charged and/or the type of battery operated vehicle associated with the battery.

The battery management cloud server 60 by way of the cloud application 63 may further alert users of various battery maintenance issues such watering batteries having low electrolyte/water levels, batteries with over temperatures, and batteries with sulfated cells requiring additional maintenance. The alerts may be communicated to the remote device or mobile device 70, for example. In some embodiments, the battery management cloud server 60 may remotely process the battery and charger status data to determine when charging faults and battery faults occur with respective batteries 21a-21n and schedule the batteries for use when no charging faults or battery faults are associated therewith. The alerts generated and sent by the management cloud server 60 may correspond to the charging faults and the battery faults.

The battery management cloud server 60 or cloud application 63 may also generate various reports and analytics for battery fleets using the saved records for the wireless battery monitors 40a-40n and wireless battery chargers 30a-30n. Such reports may include battery asset utilization, excess batteries at the site, right sizing of batteries and associated truck types, battery assessment reports, and many other battery performance and operational data.

The battery management cloud server 60 or cloud application 63 may also aggregate wireless battery charger and battery data per site or geographical location 22, per customer having multiple sites, and/or per service dealer servicing multiple customers and multiple sites, for example. All data analytics and alerts may be performed on the cloud or by the battery management cloud server 60. That is, no data processing need be performed locally. Email alerts may be sent by the battery management cloud server 60 or cloud application 63 to registered users, as will be appreciated by those skilled in the art.

As will be appreciated by those skilled in the art, prior art battery management systems may be aware of certain aspects of the present status of batteries. In contrast, the battery management system 20 described herein, advantageously determines which battery 21a-21n is cooled and ready, and makes this determination based upon historical data. For example, the ranking may be based upon battery utilization over a historical period and whether the battery is cooled. Priority may be given to batteries 21a-21n that have less historical usage and have been cooled longer. Conventional battery management systems cannot easily achieve ranking as batteries in these systems are not identified. Moreover, multiple criteria for this determination, in contrast to prior techniques, is available in the cloud. Thus, additional or separate equipment may not be desirable. In other words, the system 20 has battery status data and battery charging status data available for each battery 21a-21n both currently and historically. This data is communicated through the wireless battery chargers 30a-30n and the wireless battery monitors 40a-40n, which are physically carried by the batteries 21a-21n, thus removing the need for other or separate hardware.

Figure 4:
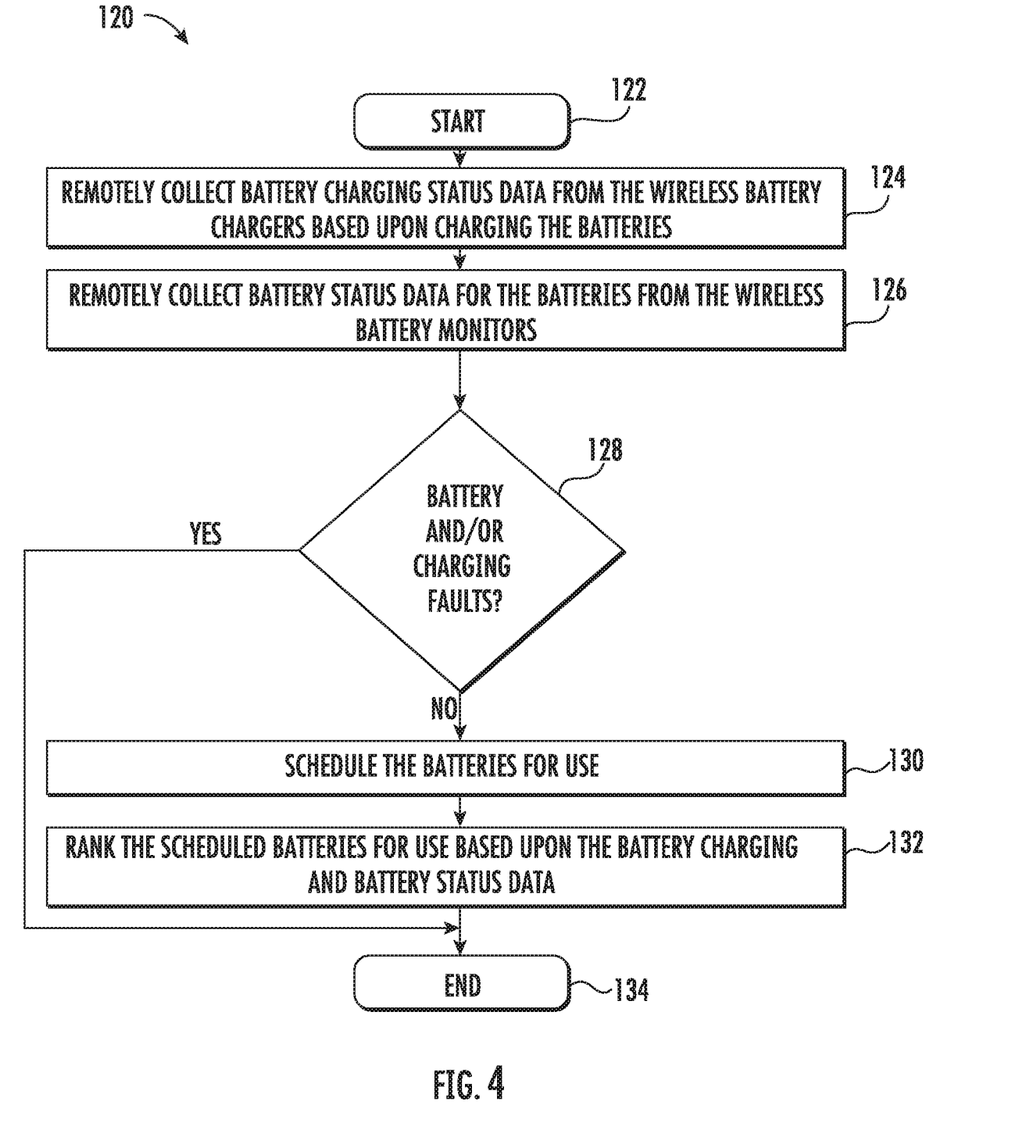
FIG. 4 is a flow chart of a method of battery management in accordance with an embodiment.

Referring now to the flowchart 120 in FIG. 4, beginning at Block 122, a battery management method is now described. At Block 124, the method includes using the battery management cloud server 60 to remotely collect battery charging status data from the wireless battery chargers 30a-30n based upon charging of the batteries 21a-21n. At Block 126, the method includes using the battery management cloud server 60 to remotely collect battery status data for the batteries from the wireless battery monitors 40a-40n. At Block 128, the battery management cloud server 60 determines whether there are any faults, for example, battery and/or charging faults with respective batteries 21a-21n. If there are no faults at Block 128, the battery management cloud server 60, at Block 130, schedules the batteries 21a-21n for use. If there are any faults (Block 128), the battery management cloud server 60 does not schedule those batteries for use and the method ends at Block 134. At Block 132 the battery management cloud server 60 ranks the scheduled batteries for use based upon the battery and charger status data. The method ends at Block 134.

A computer readable medium aspect is directed to a non-transitory computer readable medium for a battery management cloud server 60 of a battery management system 20 for batteries 21a-21n at a geographical location 22. The battery management cloud server 60 is for communicating with wireless battery chargers 30a-30n at the geographical location 22 for charging the batteries 21a-21n and wireless battery monitors 40a-40n at the geographical location and carried by associated ones of the batteries. The non-transitory computer readable medium has computer executable instructions that when executed by a processor 61 of the battery management cloud server 60 cause the processor to perform operations that include remotely collecting battery charging status data from the wireless battery chargers 30a-30n based upon charging of the batteries 21a-21n and remotely colleting battery status data for the batteries from the wireless battery monitors 40a-40n. The operations also include remotely processing the battery and charger status data to schedule the batteries 21a-21n for use based upon the battery and charger status data.

Many modifications and other embodiments will come to the mind of one skilled in the art having the benefit of the teachings presented herein. Therefore, it is understood that the foregoing is not to be limited to the specific exemplary embodiments disclosed herein.

That which is claimed is:

1. A battery management system for a plurality of batteries at a geographical location, the battery management system comprising:
   a plurality of wireless battery chargers at the geographical location for charging the plurality of batteries;
   a plurality of wireless battery monitors at the geographical location and carried by associated ones of the plurality of batteries; and
   a battery management cloud server for communicating with the wireless battery chargers and the wireless battery monitors to
      remotely collect battery charging status data from the plurality of wireless battery chargers based upon charging of the batteries,
      remotely collect battery status data for the batteries from the wireless battery monitors, and
      remotely process the battery and charger status data to schedule the batteries for use based upon the battery and charger status data.

2. The battery management system of claim 1 wherein the battery management cloud server is configured to remotely process the battery and charger status data to determine when charging faults and battery faults occur with respective batteries and schedule the batteries for use when no charging faults or battery faults are associated therewith.

3. The battery management system of claim 1 wherein the battery management cloud server is configured to rank the scheduled batteries for use based upon the battery and charger status data.

4. The battery management system of claim 3 wherein the battery management cloud server is configured to communicate to a remote device, a next battery for use from the ranked batteries.

5. The battery management system of claim 1 wherein the battery management cloud server is configured to rank the batteries based upon an order that the batteries have been successfully charged.

6. The battery management system of claim 1 wherein the battery status data comprises at least one of battery utilization and battery usage.

7. The battery management system of claim 1 wherein each battery is associated with a battery-operated vehicle, and wherein the battery management cloud server is configured to rank the batteries based upon a type of the battery-operated vehicle.

8. The battery management system of claim 1 wherein the wireless battery monitors are configured to communicate the battery status data for the batteries based upon connection of the batteries to the wireless battery chargers.

9. The battery management system of claim 1 wherein the battery charging status data comprises at least one of charger-connected-to-battery and charging, charger-connected-to-battery and cooling, charger-connected-to-battery and reporting a fault, charge cycle completed, charge cycle terminated, and charger-disconnected-from-battery.

10. The battery management system of claim 1 wherein the battery status data comprises at least one of battery type, battery temperature, battery water level, historical battery usage, battery amp-hour usage, battery life, and battery size.

11. The battery management system of claim 1 wherein the battery management cloud server is further configured to generate and send alerts to a remote device based upon the battery status data.

12. The battery management system of claim 11 wherein the alerts comprise error indications corresponding to charging faults and the battery faults.

13. A battery management method for a battery management system for a plurality of batteries at a geographical location, the method comprising:
   using a battery management cloud server for communicating with a plurality of wireless battery chargers at the geographical location for charging the plurality of batteries and a plurality of wireless battery monitors at the geographical location and carried by associated ones of the plurality of batteries, the battery management cloud server being used to
      remotely collect battery charging status data from the plurality of wireless battery chargers based upon charging of the batteries,
      remotely collect battery status data for the batteries from the wireless battery monitors, and
      remotely process the battery and charger status data to schedule the batteries for use based upon the battery and charger status data.

14. The battery management method of claim 13 wherein using the battery management cloud server comprises using the battery management cloud server to remotely process the battery and charger status data to determine when charging faults and battery faults occur with respective batteries and schedule the batteries for use when no charging faults or battery faults are associated therewith.

15. The battery management method of claim 13 wherein using the battery management cloud server comprises using the battery management cloud server to rank the scheduled batteries for use based upon the battery and charger status data.

16. The battery management method of claim 13 wherein using the battery management cloud server comprises using the battery management cloud server to rank the batteries based upon an order that the batteries have been successfully charged.

17. The battery management method of claim 13 wherein the battery status data comprises at least one of battery utilization and battery usage.

18. The battery management method of claim 13 wherein the battery charging status data comprises at least one of charger-connected-to-battery and charging, charger-connected-to-battery and cooling, charger-connected-to-battery and reporting a fault, charge cycle completed, charge cycle terminated, and charger-disconnected-from-battery.

19. The battery management method of claim 13 wherein the battery status data comprises at least one of battery type, battery temperature, battery water level, historical battery usage, battery amp-hour usage, battery life, and battery size.

20. A non-transitory computer readable medium for a battery management cloud server of a battery management system for a plurality of batteries at a geographical location, the battery management cloud server for communicating with a plurality of wireless battery chargers at the geographical location for charging the plurality of batteries and a plurality of wireless battery monitors at the geographical location and carried by associated ones of the plurality of batteries, the non-transitory computer readable medium having computer executable instructions stored thereon that when executed by a processor of the battery management cloud server cause the processor to perform operations comprising:
  remotely collecting battery charging status data from the plurality of wireless battery chargers based upon charging of the batteries,
  remotely collecting battery status data for the batteries from the wireless battery monitors, and
  remotely processing the battery and charger status data to schedule the batteries for use based upon the battery and charger status data.

21. The non-transitory computer readable medium of claim 20 wherein the operations comprise remotely processing the battery and charger status data to determine when charging faults and battery faults occur with respective batteries and schedule the batteries for use when no charging faults or battery faults are associated therewith.

22. The non-transitory computer readable medium of claim 20 wherein the operations comprise ranking the scheduled batteries for use based upon the battery and charger status data.

23. The non-transitory computer readable medium of claim 20 wherein the operations comprise ranking the batteries based upon an order that the batteries have been successfully charged.

* * * * *